US012775237B2

(12) United States Patent
Kusuda

(10) Patent No.: US 12,775,237 B2
(45) Date of Patent: Oct. 27, 2026

(54) DOCUMENT CONVEYANCE APPARATUS AND IMAGE FORMING APPARATUS

(71) Applicant: SHARP KABUSHIKI KAISHA, Sakai City (JP)

(72) Inventor: Masakatsu Kusuda, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/055,760

(22) Filed: Feb. 18, 2025

(65) Prior Publication Data

US 2025/0284241 A1 Sep. 11, 2025

(30) Foreign Application Priority Data

Mar. 5, 2024 (JP) ................................ 2024-033190

(51) Int. Cl.
*G03G 21/16* (2006.01)
*G03G 15/00* (2006.01)

(52) U.S. Cl.
CPC ......... *G03G 21/1638* (2013.01); *G03G 15/60* (2013.01); *G03G 21/1633* (2013.01)

(58) Field of Classification Search
CPC .... G03G 15/60; G03G 15/602; G03G 15/605; G03G 15/607; G03G 21/1633; G03G 21/1638
See application file for complete search history.

(56) References Cited

U.S. PATENT DOCUMENTS

| | | | | |
|---|---|---|---|---|
| 2008/0246208 | A1* | 10/2008 | Akiyama | B65H 5/38 271/226 |
| 2012/0170087 | A1* | 7/2012 | Nose | H04N 1/00543 358/498 |
| 2018/0229955 | A1* | 8/2018 | Kii | B65H 5/062 |
| 2022/0411215 | A1* | 12/2022 | Tezuka | B65H 15/004 |

FOREIGN PATENT DOCUMENTS

| | | |
|---|---|---|
| JP | 2011-088728 A | 5/2011 |

* cited by examiner

*Primary Examiner* — Carla J Therrien
(74) *Attorney, Agent, or Firm* — ScienBiziP, P.C.

(57) ABSTRACT

According to an embodiment, a document conveyance apparatus includes: an opening-and-closing cover; a driving roller and a driven roller; a driven roller holding member which rotatably holds the driven roller, and causes the driven roller to contact or be separated from the driving roller in conjunction with opening and closing of the opening-and-closing cover; and a pressure-contact spring which applies, to the driven roller holding member, a biasing force in a direction of pressing the driven roller against the driving roller. The opening-and-closing cover is provided with a side wall and a holding rib, and the driven roller holding member is provided with a first surface and a second surface. When the opening-and-closing cover is opened, the side wall contacts the first surface to bias the opening-and-closing cover in a closing direction, and the holding rib contacts the second surface to bias the same in an opening direction.

9 Claims, 15 Drawing Sheets

A-A

A-A

DOCUMENT CONVEYANCE APPARATUS AND IMAGE FORMING APPARATUS

CROSS-REFERENCE TO RELATED APPLICATION

The present application claims priority from Japanese Application JP2024-033190, the content of which is hereby incorporated by reference into this application.

BACKGROUND OF THE INVENTION

1. Field of the Invention

The present disclosure relates to a document conveyance apparatus and an image forming apparatus.

2. Description of the Related Art

In general, a document conveyance apparatus has a structure in which, when a document being conveyed by document conveyance rollers is jammed, an opening-and-closing cover is opened to have a document conveyance path opened, whereby the jammed document can be removed (i.e., jam processing can be performed). In a conventional document conveyance apparatus, a pressure-contact state of the document conveyance rollers is released in conjunction with an operation of opening the opening-and-closing cover such that the jammed document can be easily pulled out.

SUMMARY OF THE INVENTION

In a document conveyance apparatus in which jam processing is performed by opening an opening-and-closing cover, it is troublesome for the user to perform the operation of removing (pulling out) a jammed document with one hand while holding the opening-and-closing cover with the other hand. If a structure by which the opening-and-closing cover that is opened can be held without requiring the user to support the opening-and-closing cover is achieved, it becomes easy for the user to perform jam processing.

However, if a complicated structure using a spring, an arm, or the like for holding the opening-and-closing cover that is opened is employed, the number of components increases, and a space for arranging the components is also required.

The present disclosure has been conceived in view of the above-described problems, and an object of the present disclosure is to provide a document conveyance apparatus and an image forming apparatus in which jam processing by opening the opening-and-closing cover can be performed, and the opening-and-closing cover that is opened can be held with a simple configuration.

In order to solve the above problems, a document conveyance apparatus according to a first aspect of the present disclosure pertains to a document conveyance apparatus including an opening-and-closing cover which is openable and closable with respect to an apparatus housing, and the document conveyance apparatus is provided with: document conveyance rollers including a driving roller, and a driven roller provided to be contactable with and separable from the driving roller; a driven roller holding member which rotatably holds the driven roller, and causes the driven roller to be in contact with or separated from the driving roller in conjunction with opening and closing of the opening-and-closing cover; and a biasing member which applies, to the driven roller holding member, a biasing force in a direction of bringing the driven roller into pressure contact with the driving roller, in which the document conveyance apparatus is characterized in that: the opening-and-closing cover is provided with a first contact portion and a second contact portion; the driven roller holding member is provided with a first surface and a second surface; and in a state in which the opening-and-closing cover is opened, the first contact portion comes into contact with the first surface and the second contact portion comes into contact with the second surface, the first surface biases, by the biasing force of the biasing member, the first contact portion in a direction in which the opening-and-closing cover closes, and the second surface biases, by the biasing force of the biasing member, the second contact portion in a direction in which the opening-and-closing cover opens.

According to the above configuration, in a state in which the opening-and-closing cover is opened, by virtue of a balance between the biasing force acting between the first surface and the first contact portion and the biasing force acting between the second surface and the second contact portion, the opening-and-closing cover can be held in a state of being opened at a predetermined position even if the user does not support the opening-and-closing cover with his/her hand. Here, since it is possible to hold the opening-and-closing cover by using the biasing force of the biasing member for bringing the driven roller into pressure contact with the driving roller, no complicated structure using another spring, an arm, or the like, for holding the opening-and-closing cover that is opened is required.

Further, in the above document conveyance apparatus, the first contact portion and the second contact portion may be configured as a rib provided on the opening-and-closing cover.

Furthermore, in the above document conveyance apparatus, the first contact portion may be configured as a side wall of the opening-and-closing cover.

Furthermore, the above document conveyance apparatus may be configured such that the document conveyance apparatus is provided with a connection rib which connects between the ribs of the first contact portion and the second contact portion, and the connection rib is of a shape that does not contact the driven roller holding member during a process of opening and closing the opening-and-closing cover.

Also, in order to solve the above problems, a document conveyance apparatus according to a second aspect of the present disclosure pertains to a document conveyance apparatus including an opening-and-closing cover which is openable and closable with respect to an apparatus housing, and the document conveyance apparatus is provided with: document conveyance rollers including a driving roller, and a driven roller provided to be contactable with and separable from the driving roller; a driven roller holding member which rotatably holds the driven roller, and causes the driven roller to be in contact with or separated from the driving roller in conjunction with opening and closing of the opening-and-closing cover; and a biasing member which applies, to the driven roller holding member, a biasing force in a direction of bringing the driven roller into pressure contact with the driving roller, in which the document conveyance apparatus is characterized in that: the opening-and-closing cover is provided with a cover side abutment portion which contacts the driven roller holding member when the opening-and-closing cover is opened; the driven roller holding member is provided with a driven-roller-holding-member-side abutment portion which contacts the cover side abutment portion when the opening-and-closing cover is opened;

the apparatus housing is provided with a restrictor which restricts opening of the opening-and-closing cover beyond a predetermined position; and in a state in which the opening-and-closing cover is opened, the driven-roller-holding-member-side abutment portion biases, by the biasing force of the biasing member, the cover side abutment portion in a direction in which the opening-and-closing cover opens.

According to the above configuration, in a state in which the opening-and-closing cover is opened, by virtue of the biasing force acting between the driven-roller-holding-member-side abutment portion and the cover side abutment portion, it is possible to prevent the opening-and-closing cover from being closed by its own weight, and the opening-and-closing cover that is opened can also be held at a predetermined position by the restrictor.

Further, the above document conveyance apparatus may be configured such that the restrictor is in a shape of a hook, and when the opening-and-closing cover is opened to the predetermined position, the hook engages with a side wall of the opening-and-closing cover.

Furthermore, an image forming apparatus according to a third aspect of the present disclosure is characterized by including the document conveyance apparatus described above.

The document conveyance apparatus and the image forming apparatus of the present disclosure bring about an advantage of being able to keep the state in which the opening-and-closing cover is opened by using the biasing force of the biasing member for bringing the driven roller into pressure contact with the driving roller, enabling jam processing to be performed by opening the opening-and-closing cover, and also being able to hold the opening-and-closing cover that is opened with a simple configuration.

DETAILED DESCRIPTION OF THE INVENTION

First Embodiment

Figure 1:
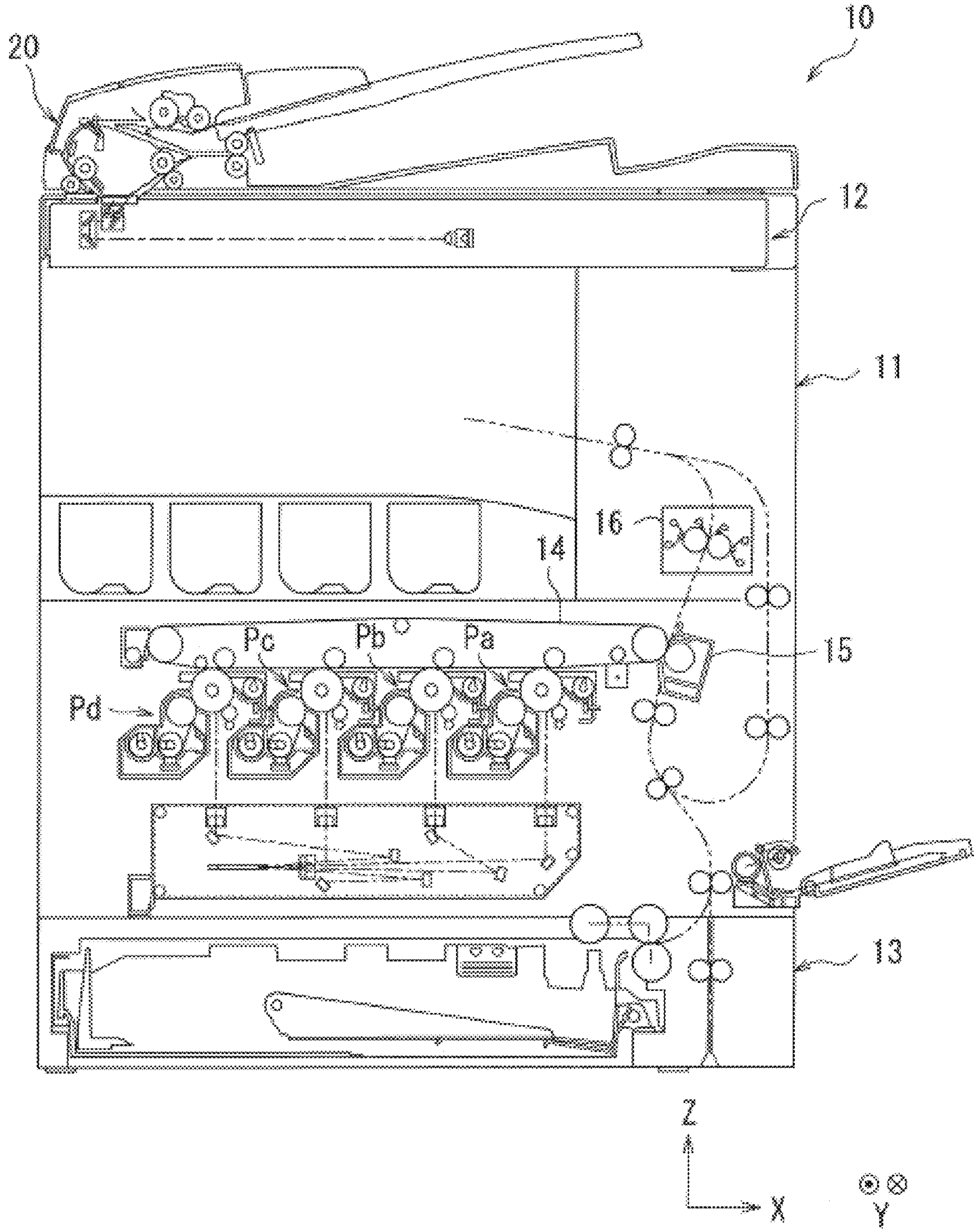
FIG. 1 is a schematic cross-sectional view illustrating a configuration example of an image forming apparatus on which a document conveyance apparatus of the present disclosure is mounted.

In the following, embodiments of the present disclosure will be described in detail with reference to the drawings. First, an overall configuration of an image forming apparatus 10 according to the present embodiment will be described. FIG. 1 is a schematic configuration diagram of the image forming apparatus 10 on which a document conveyance apparatus 20 of the present disclosure is mounted. While the image forming apparatus 10 illustrated in FIG. 1 is a color image forming apparatus including a plurality of process units, the present disclosure is not limited to the above and may also be applied to a monochrome image forming apparatus including a single process unit. Further, in the present embodiment, an X direction indicated in the drawings is assumed as a width direction, a Y direction is assumed as a depth direction, and a Z direction is assumed as a height direction.

As illustrated in FIG. 1, the image forming apparatus 10 is constituted by including a main body part 11, a document reader 12, a document conveyance apparatus 20, and a paper feeding apparatus 13. The main body part 11 includes therein an image former for forming (printing) an image on a sheet of recording paper. The document reader 12 is arranged above the main body part 11, and reads a document when the document is to be copied. In an automatic reading mode, the document conveyance apparatus 20 sequentially conveys documents that are placed on a document set tray toward a document placement table of the document reader 12. The paper feeding apparatus 13 is provided with at least one paper feed cassette in which sheets of recording paper are stocked, and the paper feeding apparatus 13 separates the sheets of recording paper one by one from the selected paper feed cassette and conveys the recording paper toward the main body part 11. In the main body part 11, an image is formed on the recording paper sent from the paper feeding apparatus 13.

Image data handled in the image forming apparatus 10 is that corresponding to a color image using colors which are black (K), cyan (C), magenta (M), and yellow (Y), or that corresponding to a monochrome image using a single color (e.g., black). Therefore, the image forming apparatus 10 includes, as the image former, four process units which are Pa to Pd associated with black, cyan, magenta, and yellow. Each of the process units Pa to Pd forms a toner image corresponding to the image data by using publicly known electrophotographic technology.

The toner images formed by the respective process units Pa to Pd are sequentially transferred to and superimposed on an intermediate transfer belt 14. A colored toner image is thus formed on the intermediate transfer belt 14. The colored toner image on the intermediate transfer belt 14 is transferred onto the recording paper by a transfer apparatus 15, and then a fixing unit 16 heats and pressurizes the recording paper to fix the colored toner image on the recording paper.

Figure 2:
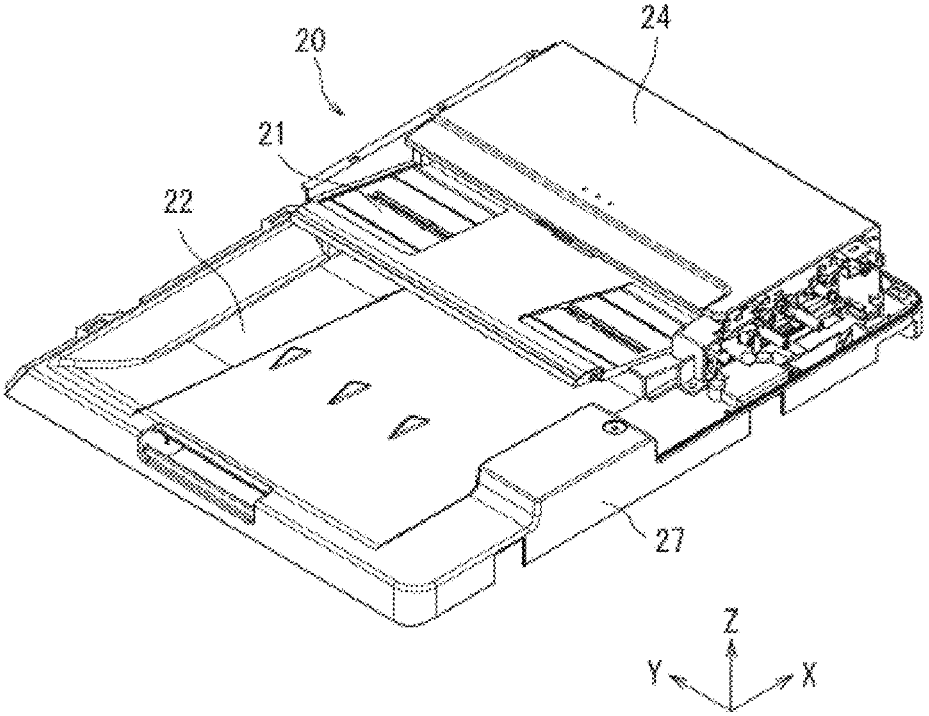
FIG. 2 is a perspective view showing the outside appearance of a document conveyance apparatus in a state in which an opening-and-closing cover is closed.
Figure 3:
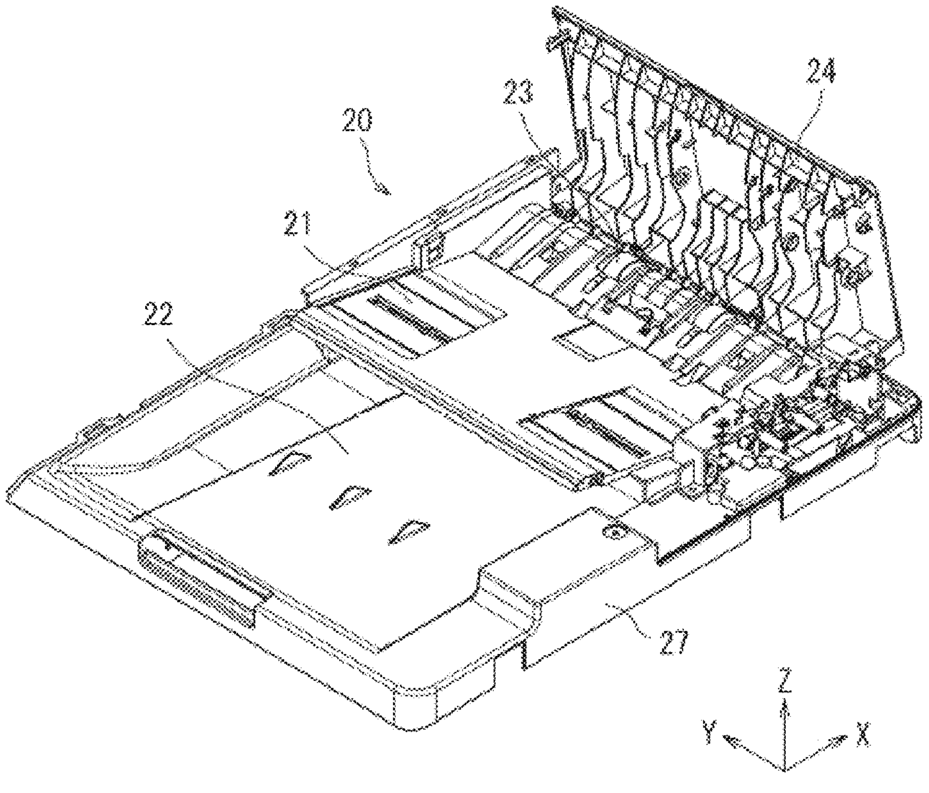
FIG. 3 is a perspective view showing the outside appearance of the document conveyance apparatus in a state in which the opening-and-closing cover is opened.

FIGS. 2 and 3 are perspective views each showing the outside appearance of the document conveyance apparatus 20. FIG. 2 is a perspective view of the document conveyance apparatus 20 in a state in which an opening-and-closing cover 24 is closed, and FIG. 3 is a perspective view of the same in a state in which the opening-and-closing cover 24 is opened. The document conveyance apparatus 20 includes a document tray 21 on which a bundle of documents before reading is conducted is placed and a paper discharge tray 22 on which the read document is to be discharged, and a document conveyance path is formed between the document tray 21 and the paper discharge tray 22. The documents are fed to the document conveyance path one by one from the bundle of documents that are placed on the document tray 21, and are read while being conveyed. Document conveyance rollers 23 (FIG. 3) are rollers that convey a document in the document conveyance path.

Further, on the upper part of the document conveyance apparatus 20, the opening-and-closing cover 24, which can be opened and closed with respect to an apparatus housing 27 by being rotated about a rotation shaft 271 (FIGS. 5 and 7), is provided, and the document conveyance path can be made open by opening the opening-and-closing cover 24. The opening-and-closing cover 24 is opened by lifting an end portion thereof on a side opposite to the rotation shaft 271 upward. Further, in the present embodiment, the rotation shaft 271 is provided on the apparatus housing 27, and a shaft hole through which the rotation shaft 271 passes is provided in the opening-and-closing cover 24.

Figure 4:
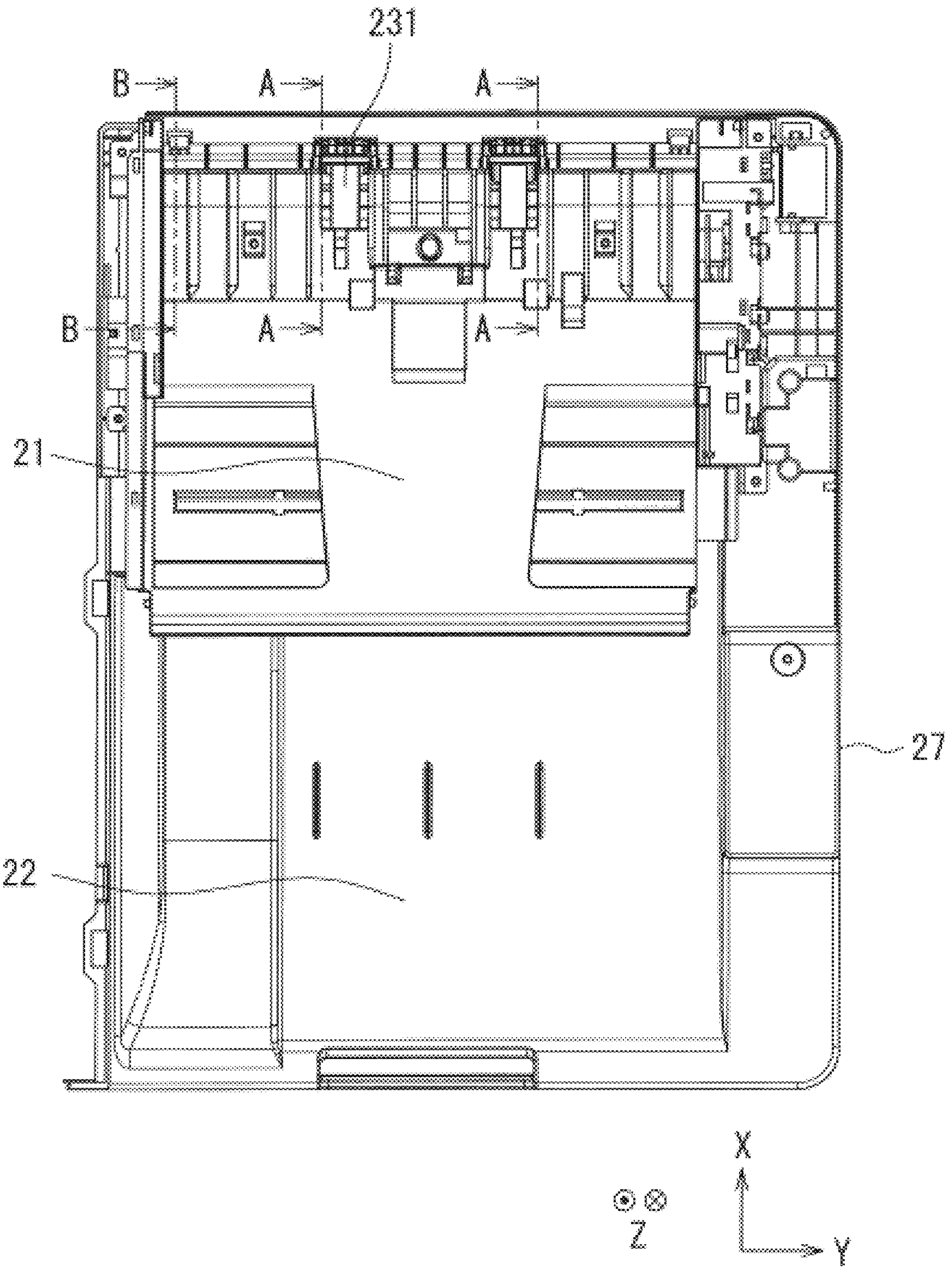
FIG. 4 is a plan view of the document conveyance apparatus in a state in which the opening-and-closing cover is removed.
Figure 5:
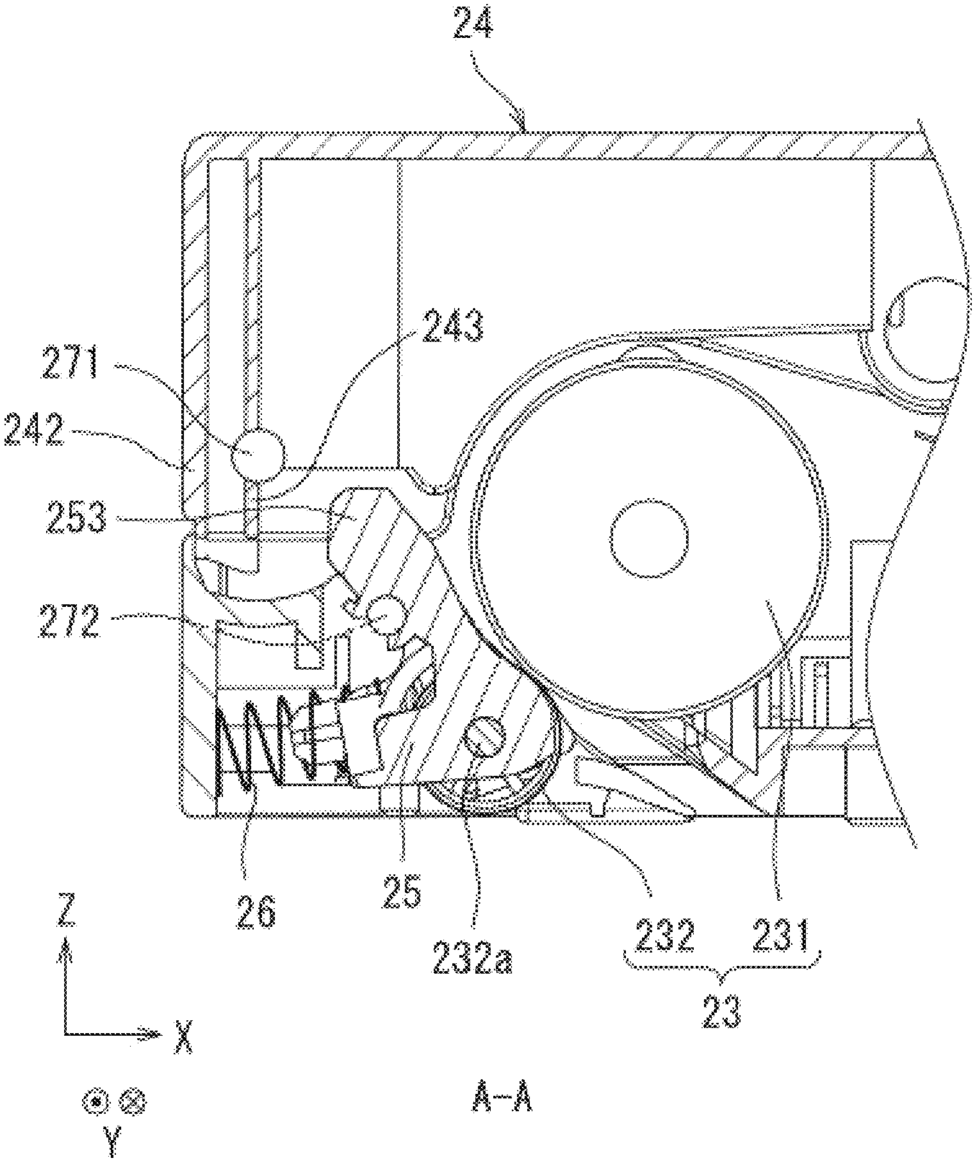
FIG. 5 is a partial cross-sectional view of the vicinity of document conveyance rollers in a document conveyance apparatus in a state in which an opening-and-closing cover is closed in a first embodiment.

FIG. 4 is a plan view of the document conveyance apparatus 20 in a state in which the opening-and-closing cover 24 is removed. FIG. 5 is a partial cross-sectional view of the vicinity of the document conveyance rollers 23 in the document conveyance apparatus 20 in a state in which the opening-and-closing cover 24 is closed. Note that a cross section illustrated in FIG. 5 exists in at least one place along a front-rear direction of the document conveyance apparatus 20 (i.e., a rotation axis direction of the opening-and-closing cover 24), and should preferably exist in two or more places. In the present embodiment, it is assumed that the cross section illustrated in FIG. 5 corresponds to, for example, an A-A cross section in FIG. 4. Also, in the present embodiment, it is assumed that the cross sections illustrated in FIGS. 7, 8, 10, and 11 correspond to, for example, the A-A cross section in FIG. 4.

As illustrated in FIG. 5, the document conveyance rollers 23 are formed as a pair of rollers including a driving roller 231 and a driven roller 232. In the document conveyance rollers 23, the driven roller 232 is provided to be contactable with and separable from the driving roller 231. That is, the driven roller 232 is movable in accordance with the opening and closing operation of the opening-and-closing cover 24. The driven roller 232 is in contact with the driving roller 231 in a state in which the opening-and-closing cover 24 is closed, and is separated from the driving roller 231 in a state in which the opening-and-closing cover 24 is opened. By this configuration, when a conveyance jam occurs due to a paper jam at the document conveyance rollers 23, the opening-and-closing cover 24 is opened to have the document conveyance path opened, and the holding of a document by the document conveyance rollers 23 is also released. Thus, it becomes easy to remove the jammed document.

Figure 6:
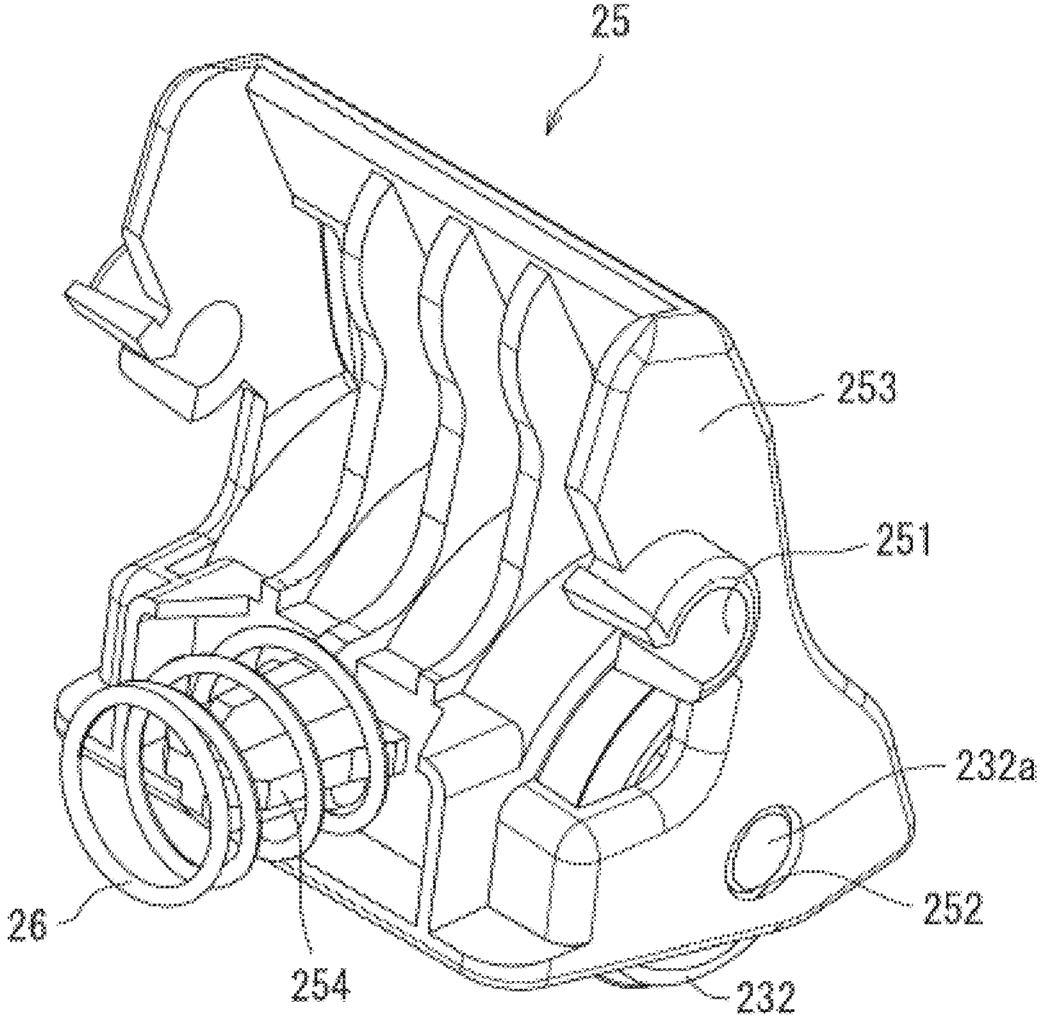
FIG. 6 is a perspective view of a driven roller holding member.

Specifically, a rotation shaft 232*a* of the driven roller 232 is axially supported by a driven roller holding member 25, and the driven roller holding member 25 is made turnable about a rotation shaft 272 provided on the apparatus housing 27. FIG. 6 is a perspective view of the driven roller 232, the driven roller holding member 25, and a pressure-contact spring (biasing member) 26 to be described later. As illustrated in FIG. 6, the driven roller holding member 25 includes a bearing portion 251 which is fitted with the rotation shaft 272, and a shaft hole 252 which axially supports the rotation shaft 232*a* of the driven roller 232.

In the driven roller holding member 25, the bearing portion 251 axially supports the rotation shaft 232*a* of the driven roller 232 on the lower side relative to the rotation shaft 272. Further, the driven roller holding member 25 includes an abutment portion (driven-roller-holding-member-side abutment portion) 253 on the upper side relative to the rotation shaft 272. Furthermore, the driven roller holding member 25 is subjected to a biasing force exerted by the pressure-contact spring 26, and in a state in which the opening-and-closing cover 24 is closed, the driven roller 232 is brought into pressure contact with the driving roller 231 by the biasing force of the pressure-contact spring 26. Note that one end of the pressure-contact spring 26 is fitted with a projection portion 254 (FIG. 6) of the driven roller holding member 25, and the other end of the pressure-contact spring 26 abuts against an inner surface of a side wall of the apparatus housing 27.

Figure 7:
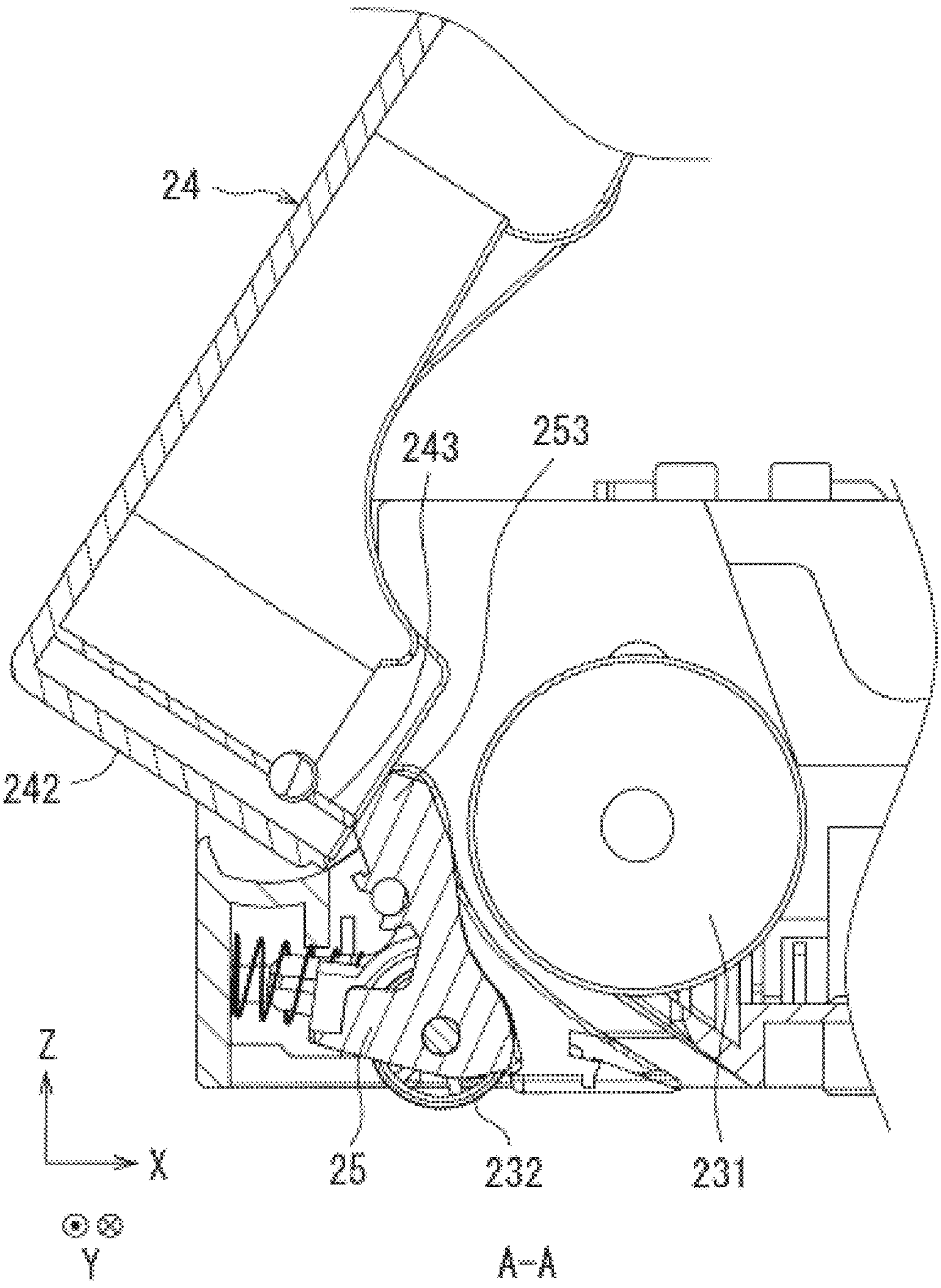
FIG. 7 is a partial cross-sectional view of the vicinity of the document conveyance rollers in the document conveyance apparatus in a state of being in the process of opening the opening-and-closing cover in the first embodiment.
Figure 8:
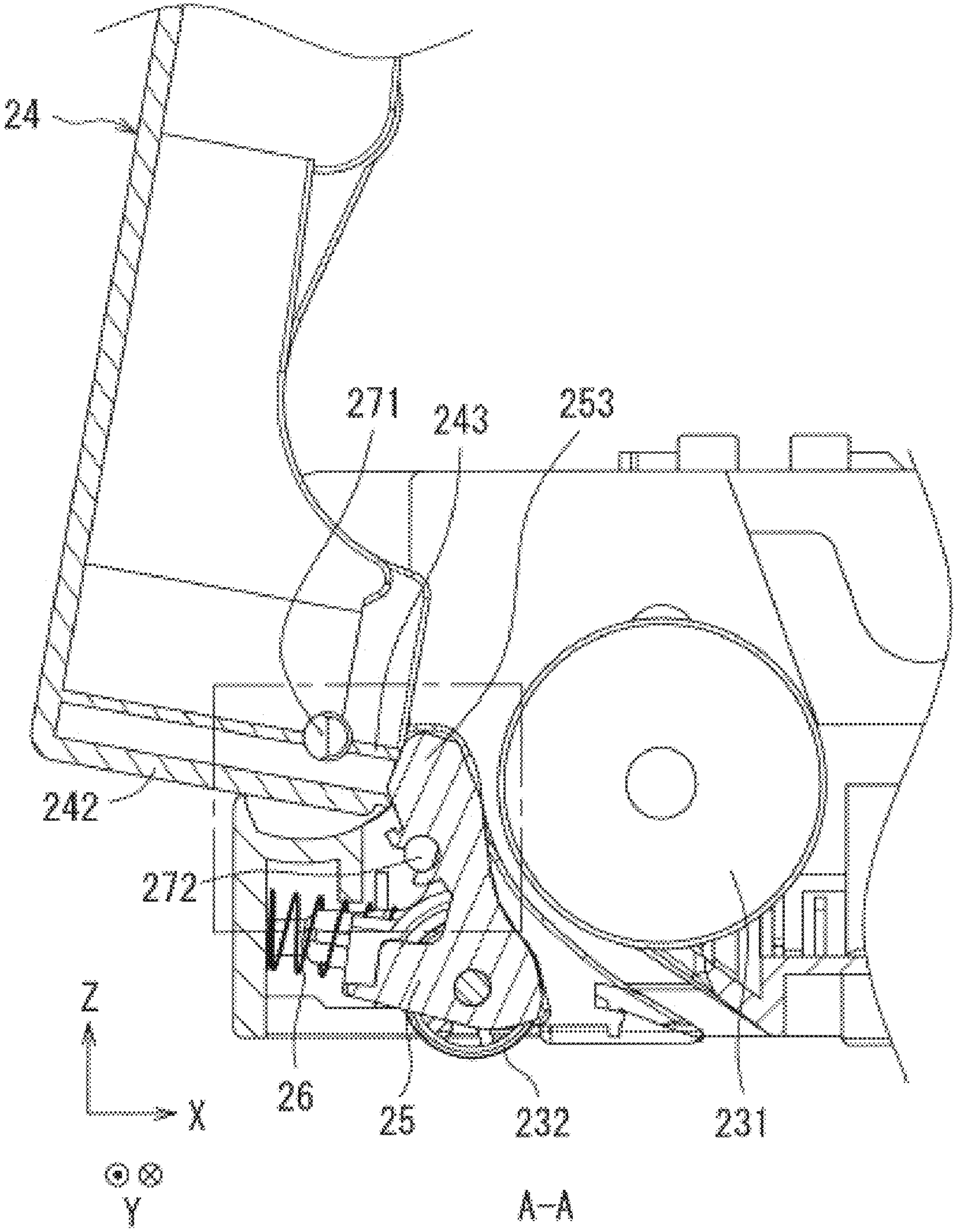
FIG. 8 is a partial cross-sectional view of the vicinity of the document conveyance rollers in the document conveyance apparatus in a state in which the opening-and-closing cover is opened in the first embodiment.
Figure 9:
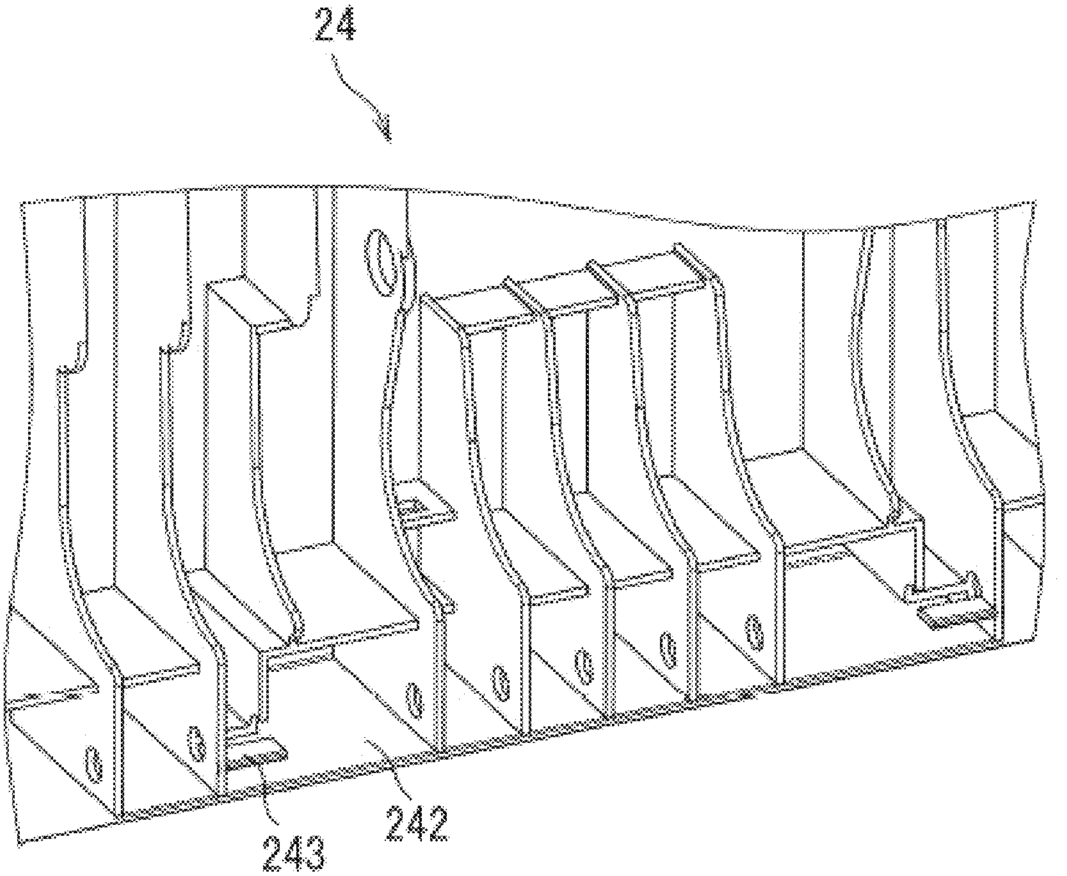
FIG. 9 is an enlarged perspective view of an end portion of the opening-and-closing cover on a rotation shaft side in the first embodiment.

FIG. 7 is a partial cross-sectional view of the vicinity of the document conveyance rollers 23 in the document conveyance apparatus 20 in a state of being in the process of opening the opening-and-closing cover 24. FIG. 8 is a partial cross-sectional view of the vicinity of the document conveyance rollers 23 in the document conveyance apparatus 20 in a state in which the opening-and-closing cover 24 is opened. FIG. 9 is an enlarged perspective view of an end portion of the opening-and-closing cover 24 on the rotation shaft side.

As illustrated in FIG. 9, at the end portion of the opening-and-closing cover 24 on the rotation shaft side, a holding rib (second contact portion) 243 is provided on the inner side of a side wall (first contact portion) 242. It is sufficient if the holding rib 243 is provided at a position which abuts against at least the abutment portion 253 in the rotation axis direction of the opening-and-closing cover 24.

In the document conveyance apparatus 20, as illustrated in FIG. 5, neither the side wall 242 nor the holding rib 243 is in contact with the abutment portion 253 in a state in which the opening-and-closing cover 24 is closed. That is, the opening-and-closing cover 24 does not exert any force on the driven roller holding member 25. In the document conveyance apparatus 20, as illustrated in FIG. 7, the holding rib 243 of the opening-and-closing cover 24 comes into contact with the abutment portion 253 of the driven roller holding member 25 during the process of opening the opening-and-closing cover 24, and the opening-and-closing cover 24 is opened while the holding rib 243 is kept in contact with the abutment portion 253. Consequently, a rotational force in a direction opposite to the biasing force of the pressure-contact spring 26 is applied to the driven roller holding member 25. By this rotational force, the driven roller holding member 25 rotates about the rotation shaft 272 in a clockwise direction and separates the driven roller 232 from the driving roller 231. Up to a point in the middle of the process of opening the opening-and-closing cover 24, the state in which the holding rib 243 is in contact with the abutment portion 253 but the side wall 242 does not contact the driven roller holding member 25 is exhibited (this state is referred to as a first state).

Figure 10:
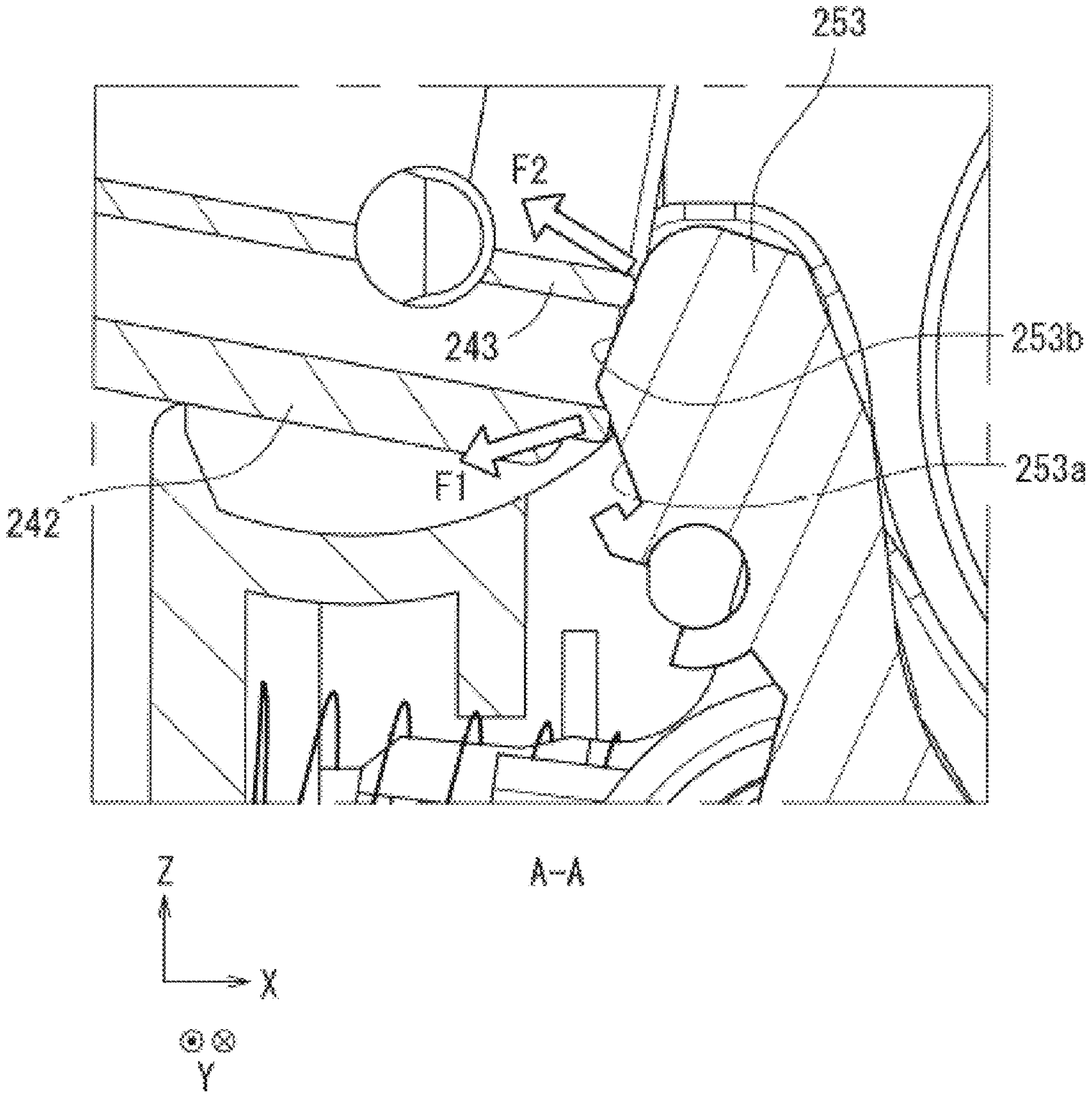
FIG. 10 is a diagram illustrating an action by which the opening-and-closing cover is held in an opened state in the first embodiment.

When the opening-and-closing cover 24 is further moved in an open direction from the first state, as illustrated in FIG. 8, the state in which both the side wall 242 and the holding rib 243 of the opening-and-closing cover 24 abut against the abutment portion 253 is exhibited (this state is referred to as a second state). In the second state of the document conveyance apparatus 20, by the abutment of the side wall 242 and the holding rib 243 against the abutment portion 253, the opening-and-closing cover 24 can be held in a state in which the opening-and-closing cover 24 is opened without requiring the user to support the opening-and-closing cover 24 with his/her hand. FIG. 10 is a diagram illustrating an action by which the opening-and-closing cover 24 is held in an opened state. As regards the opening-and-closing cover 24 of this case, the weight of the opening-and-closing cover 24 itself in the opened state acts in a direction of closing the opening and closing cover 24.

As illustrated in FIG. 10, the abutment portion 253 includes a first surface 253*a* and a second surface 253*b* having different angles when viewed from the rotation axis direction of the opening-and-closing cover 24. The second surface 253*b* is provided below the first surface 253*a*. In the second state in which the opening-and-closing cover 24 is opened, the side wall 242 abuts against the first surface 253*a*, and the holding rib 243 abuts against the second surface 253*b*.

Further, in the second state, since the biasing force exerted by the pressure-contact spring 26 acts on the driven roller holding member 25, the driven roller holding member 25 exerts a pressing force on the opening-and-closing cover 24. Specifically, the opening-and-closing cover 24 receives a pressing force F1 from the driven roller holding member 25 at a place of abutment between the side wall 242 and the first surface 253*a*, and receives a pressing force F2 from the driven roller holding member 25 at a place of abutment between the holding rib 243 and the second surface 253*b*. Here, while the pressing force F1 acts downward so as to bias the opening-and-closing cover 24 in a closing direction, the pressing force F2 acts upward so as to bias the opening-and-closing cover 24 in an opening direction. Note that causing the pressing forces F1 and F2 to act as described above can be achieved by appropriately adjusting the inclination angles of the first surface 253*a* and the second surface 253*b* of the abutment portion 253. Preferably, an angle between the first surface 253*a* and the second surface 253*b* should be an obtuse angle greater than 90 degrees and smaller than 180 degrees.

In the document conveyance apparatus 20 of the present embodiment, by virtue of a balance between the pressing force F1 and the pressing force F2 in the second state in which the opening-and-closing cover 24 is opened, the opening-and-closing cover 24 can be held in a state of being opened at a predetermined position even if the user does not support the opening-and-closing cover 24 with his/her hand.

Further, with the configuration of the present embodiment, it is possible to hold the opening-and-closing cover 24 in the opened state by using a spring force of the pressure-contact spring 26 for bringing the driven roller 232 into pressure contact with the driving roller 231. Thus, no complicated structure using another spring, an arm, or the like, for holding the opening-and-closing cover that is opened is required. In other words, jam processing by opening the opening-and-closing cover 24 can be performed, and it becomes possible to hold the opening-and-closing cover 24 that is opened with a simple configuration.

Note that in the present embodiment, in the first state, as the holding rib 243 comes into contact with the second surface 253*b*, the driven roller 232 is separated from the driving roller 231. Then, when the opening-and-closing cover 24 is opened from the first state, the state in which the holding rib 243 is in contact with the second surface 253*b* is maintained, and further in the second state in which the opening-and-closing cover 24 is opened, the side wall 242 comes into contact with the first surface 253*a*.

In the opening-and-closing cover 24, since both the side wall 242 and the holding rib 243 which abut against the driven roller holding member 25 are formed as ribs (the side wall is also regarded as a rib), the opening-and-closing cover 24 can be easily molded without complicating the shape of the opening-and-closing cover 24.

Figure 11:
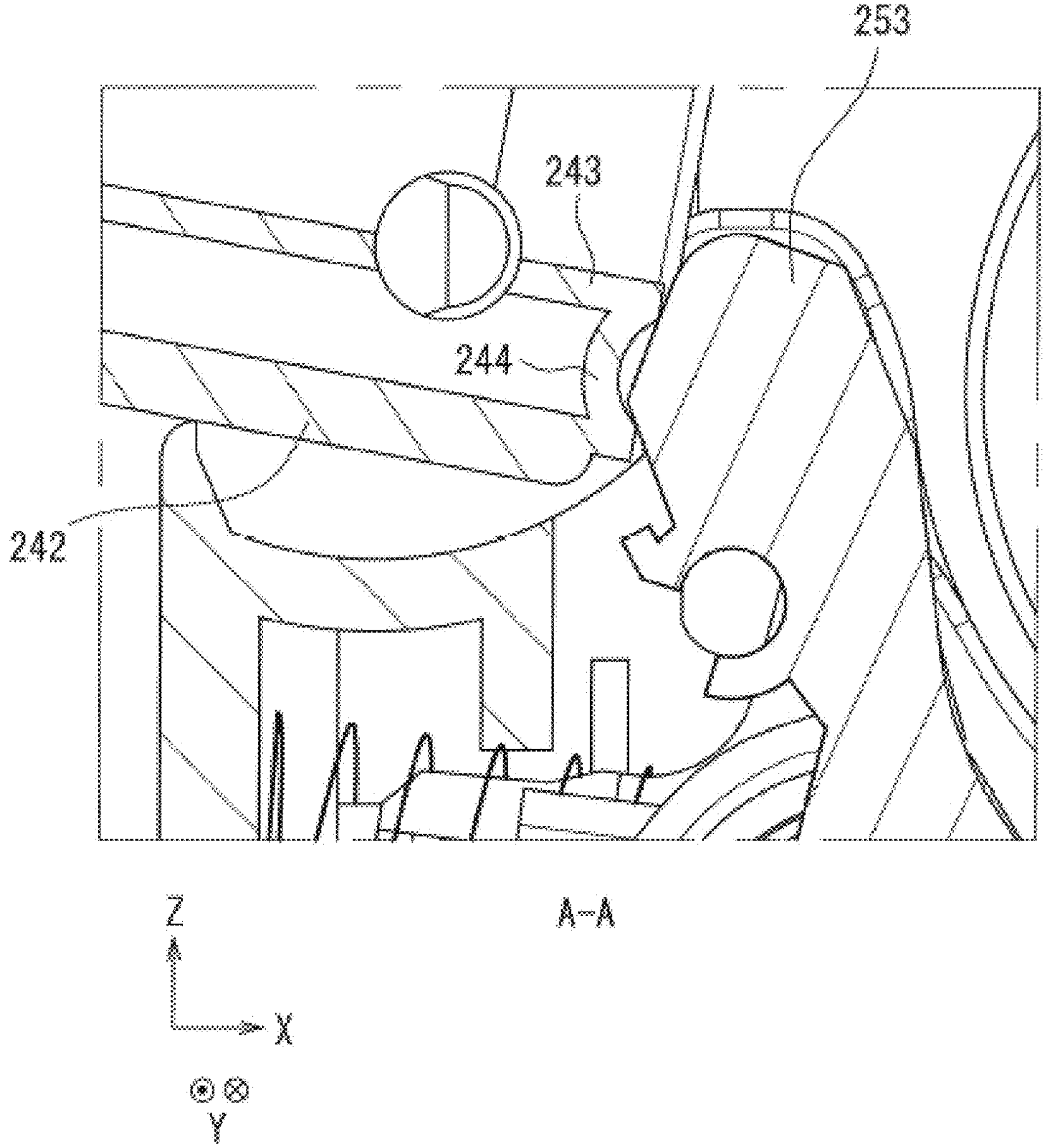
FIG. 11 is a partial cross-sectional view of the vicinity of the document conveyance rollers, which illustrates a modified example of the document conveyance apparatus of the first embodiment.

FIG. 11 is a partial cross-sectional view of the vicinity of the document conveyance rollers 23, which illustrates a modified example of the document conveyance apparatus 20 of the present embodiment. In the document conveyance apparatus 20 illustrated in FIG. 11, the side wall 242 and the vicinity of a front edge of the holding rib 243 in the opening-and-closing cover 24 are connected to each other by a connection rib 244. By virtue of the connection rib 244, deformation of the side wall 242 and the holding rib 243 is suppressed when the opening-and-closing cover 24 is held in an opened state, and the opening-and-closing cover 24 can be stably held. Note that the connection rib 244 is formed in a shape that does not contact the driven roller holding member 25 during the process of opening and closing the opening-and-closing cover 24. In the example of FIG. 11, the connection rib 244 has a substantially U-shaped cross section which is curved toward the side opposite to the driven roller holding member 25. Consequently, the connection rib 244 is formed in a shape that does not contact the driven roller holding member 25.

Second Embodiment

Figure 12:
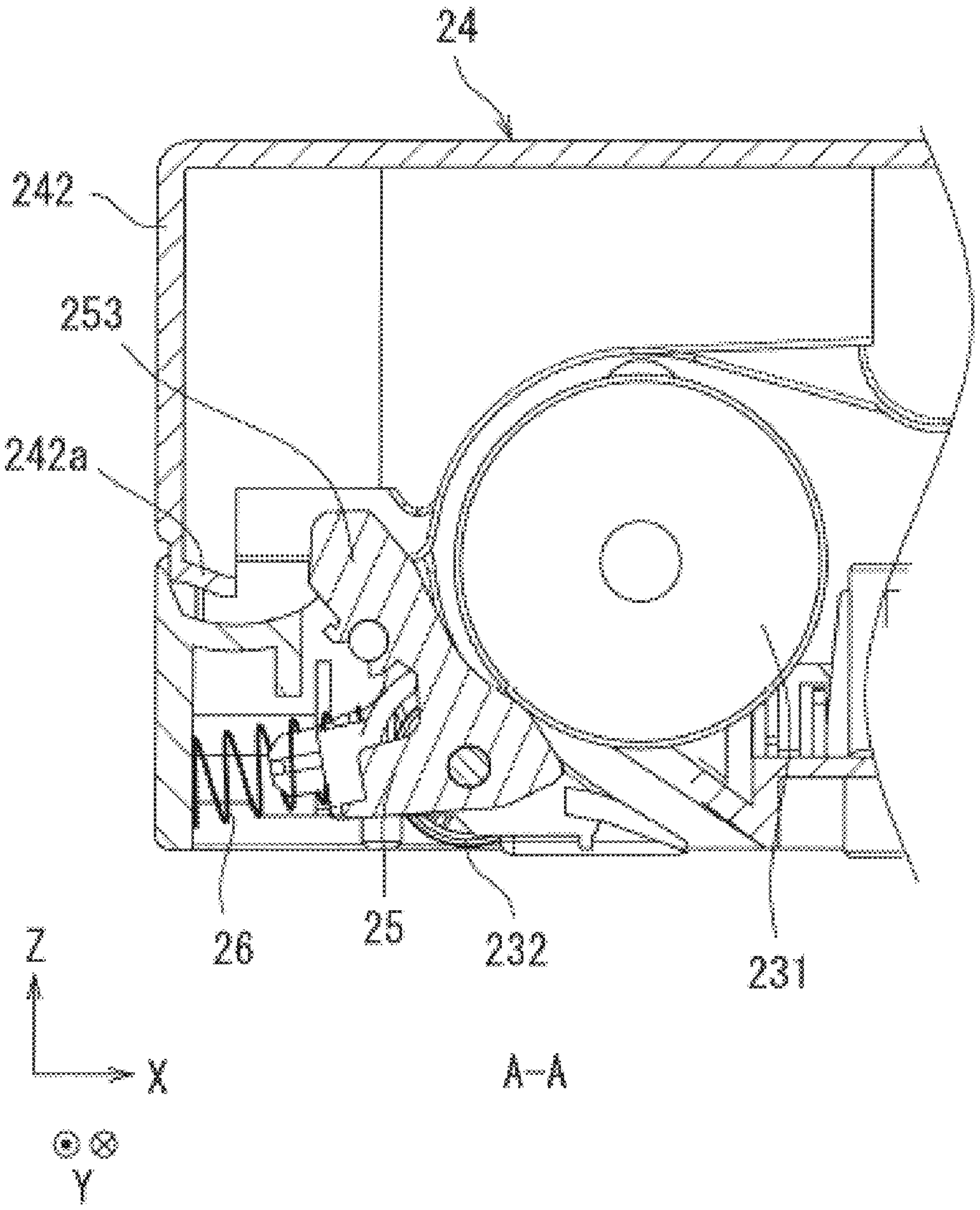
FIG. 12 is a partial cross-sectional view of the vicinity of document conveyance rollers in a document conveyance apparatus in a state in which an opening-and-closing cover is closed in a second embodiment.
Figure 13:
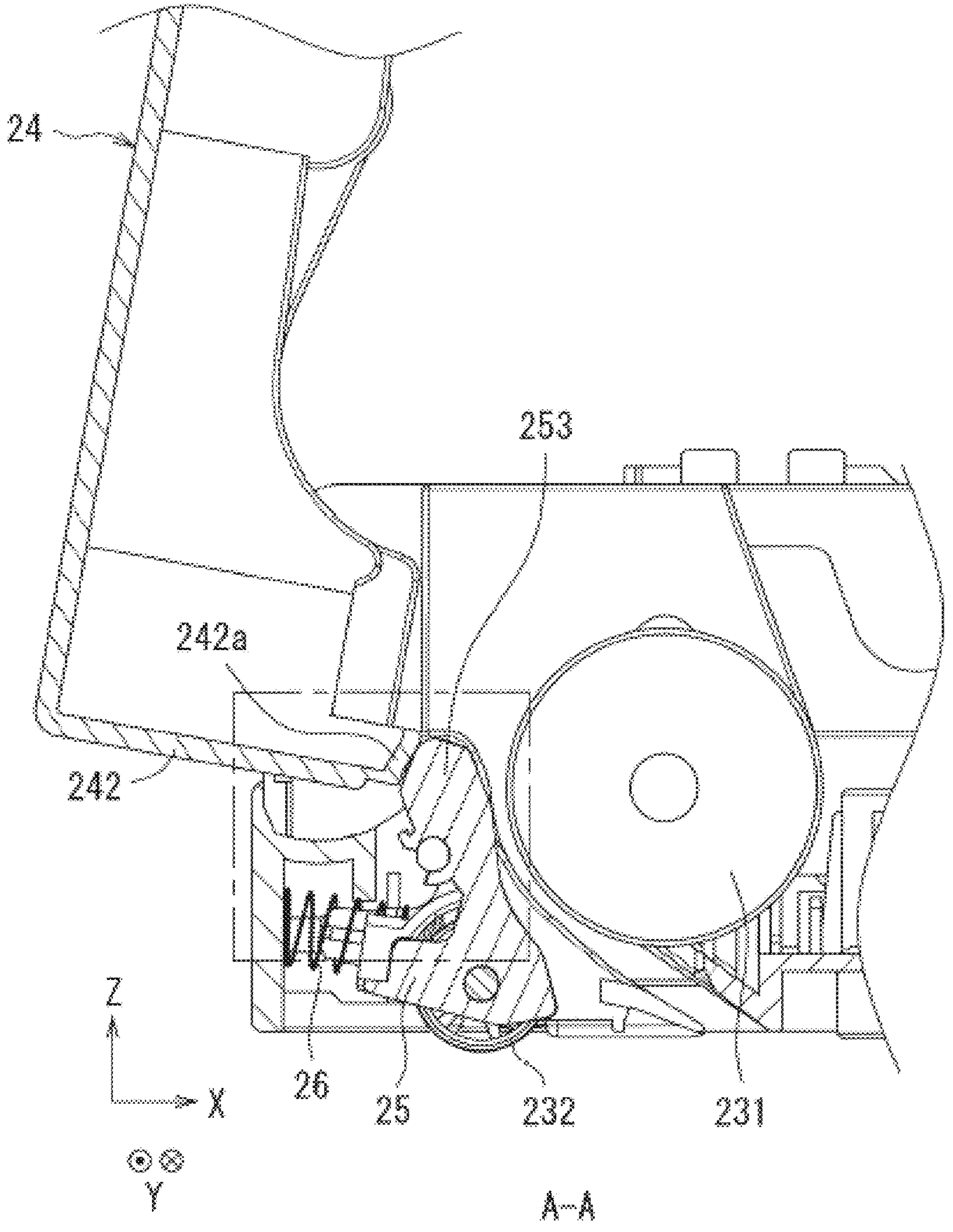
FIG. 13 is a partial cross-sectional view of the vicinity of the document conveyance rollers in the document conveyance apparatus in a state in which the opening-and-closing cover is opened in the second embodiment.
Figure 14:
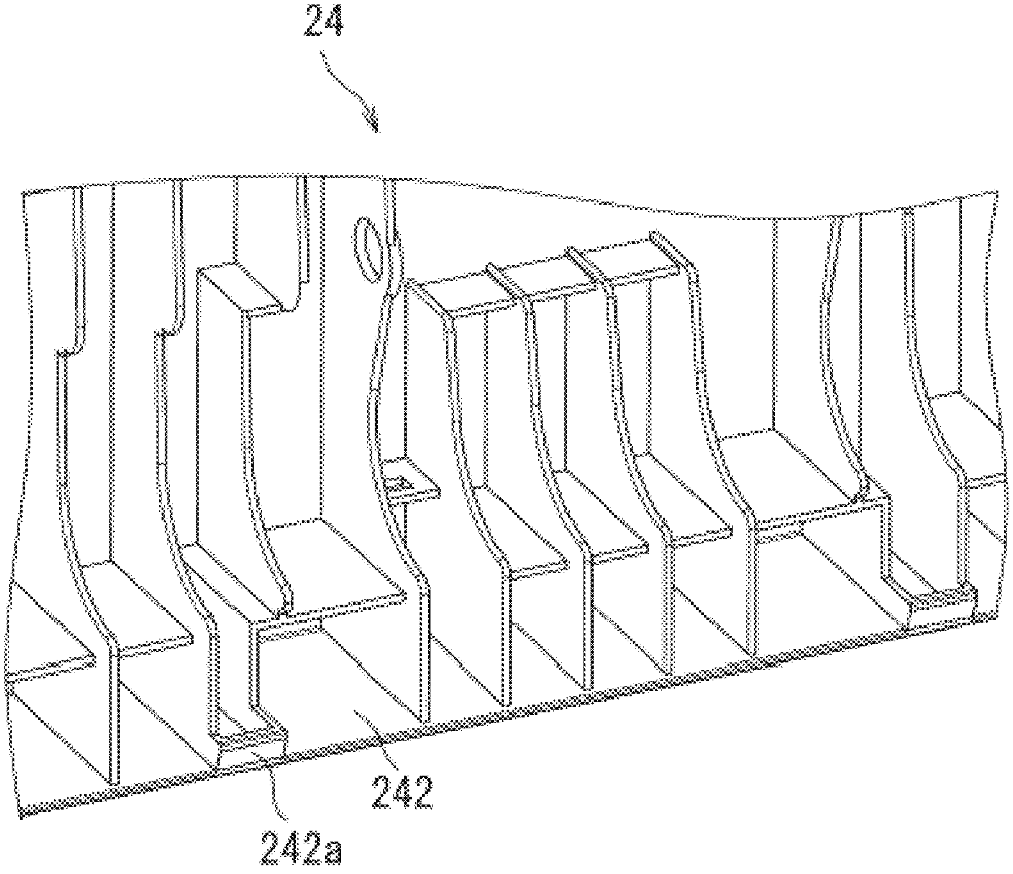
FIG. 14 is an enlarged perspective view of an end portion of the opening-and-closing cover on a rotation shaft side in the second embodiment.
Figure 15:
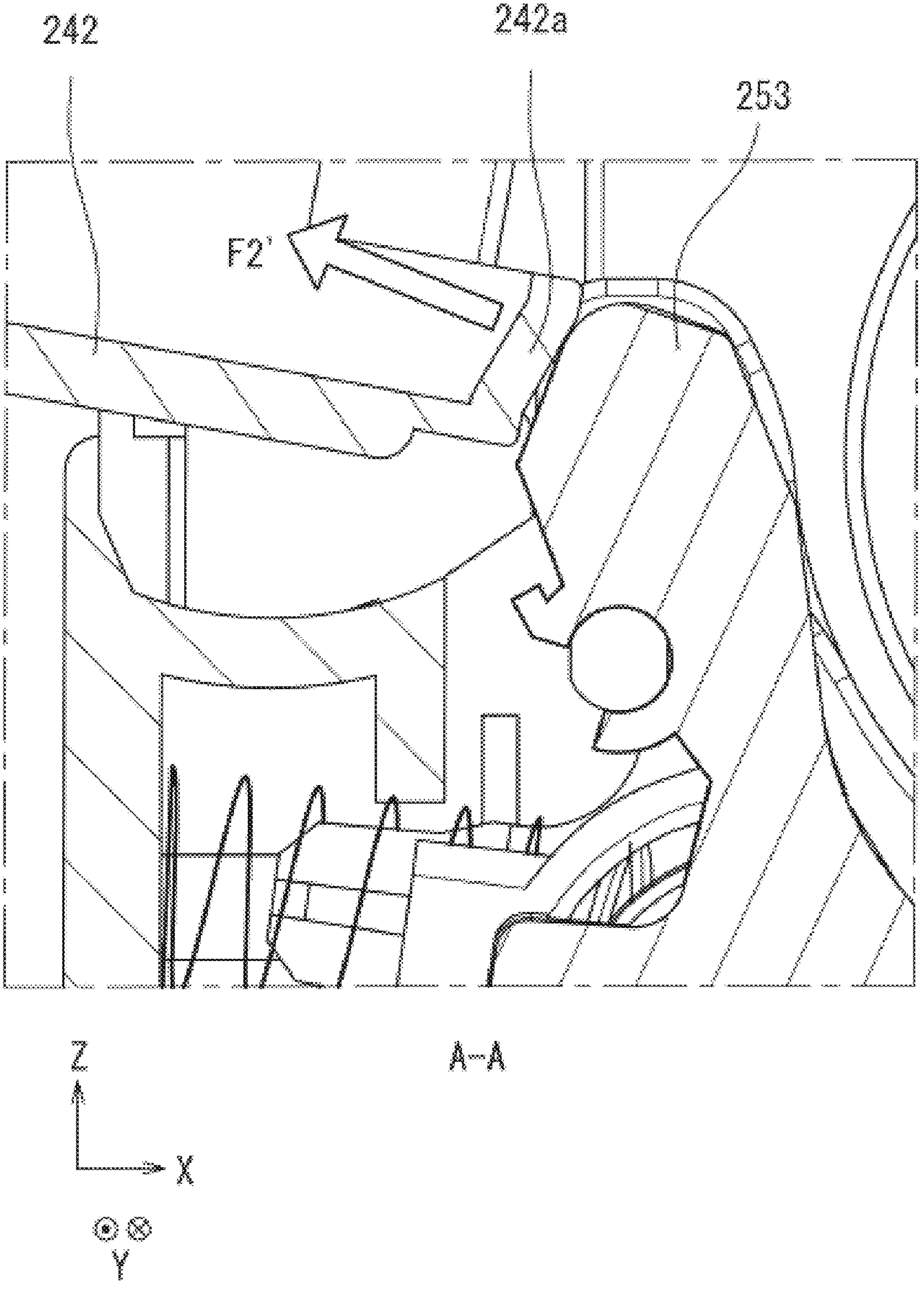
FIG. 15 is a diagram illustrating an action by which the opening-and-closing cover is held in an opened state in the second embodiment.

A document conveyance apparatus 20 according to a second embodiment will be described below with reference to FIGS. 12 to 16. FIG. 12 is a partial cross-sectional view of the vicinity of document conveyance rollers 23 in the document conveyance apparatus 20 in a state in which an opening-and-closing cover 24 is closed. FIG. 13 is a partial cross-sectional view of the vicinity of the document conveyance rollers 23 in the document conveyance apparatus 20 in a state in which the opening-and-closing cover 24 is opened. FIG. 14 is an enlarged perspective view of an end portion of the opening-and-closing cover 24 on a rotation shaft side. FIG. 15 is a diagram illustrating an action by which the opening-and-closing cover 24 is held in an opened state. In the present embodiment, it is assumed that the cross sections illustrated in FIGS. 12, 13, and 15 correspond to, for example, the A-A cross section in FIG. 4. In the second embodiment, configurations which are the same as those of the first embodiment are denoted by the same reference numerals as in the first embodiment, and detailed description thereof will be omitted.

As illustrated in FIGS. 12 to 15, at the end portion of the opening-and-closing cover 24 on the rotation shaft side, the holding rib 243 of the first embodiment is not provided, but instead a cover side abutment portion 242*a* is provided at a front edge of a side wall 242.

As illustrated in FIG. 15, in the present embodiment, in a state in which the opening-and-closing cover 24 is opened, the cover side abutment portion 242*a* abuts against an abutment portion (driven-roller-holding-member-side abutment portion) 253 of a driven roller holding member 25. At this time, since a biasing force exerted by a pressure-contact spring 26 acts on the driven roller holding member 25, the driven roller holding member 25 exerts a pressing force on the opening-and-closing cover 24. Specifically, the opening-and-closing cover 24 receives a pressing force F2' from the driven roller holding member 25 at a place of abutment between the cover side abutment portion 242*a* and the abutment portion 253. The pressing force F2' corresponds to the pressing force F2 (FIG. 10) of the first embodiment, and acts upward so as to bias the opening-and-closing cover 24 in an opening direction.

Figure 16:
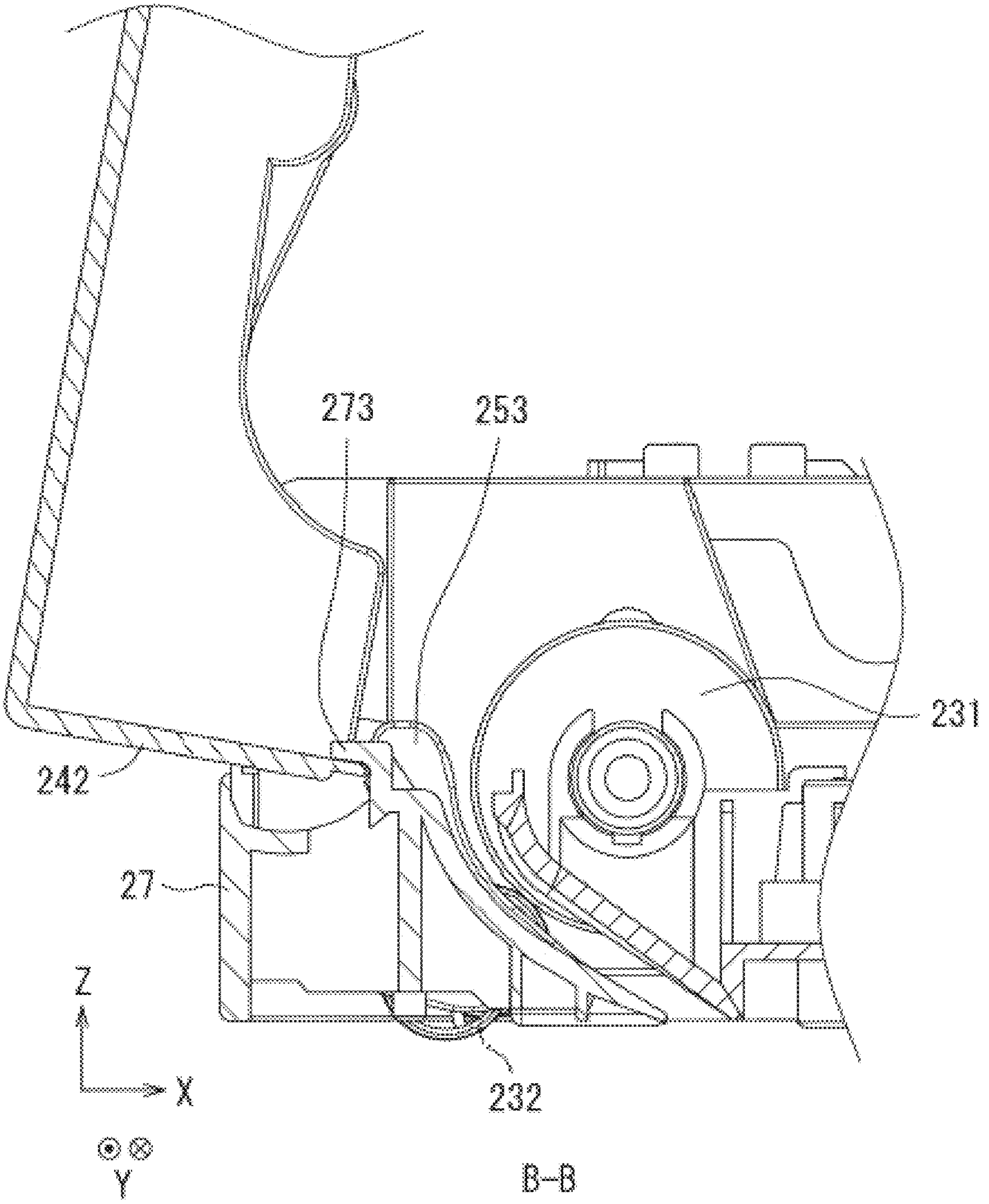
FIG. 16 is a cross-sectional view illustrating a restrictor in the second embodiment.

In addition, the document conveyance apparatus 20 according to the present embodiment is provided with a restrictor which prevents the opening-and-closing cover 24 from opening beyond a predetermined position. In the present embodiment, as illustrated in FIG. 16, a restrictor 273 in a shape of a hook (claw) is provided on an apparatus housing 27. The hook of the restrictor 273 is formed to be oriented on the outer side of the apparatus housing 27, more specifically, the side toward the opening-and-closing cover 24. In this configuration, when the opening-and-closing cover 24 is opened to the predetermined position, the hook of the restrictor 273 engages with the side wall 242 of the opening-and-closing cover 24, whereby the opening-and-closing cover 24 is prevented from opening beyond the predetermined position. The restrictor 273 can be provided at an arbitrary place in an axial direction of the opening-and-closing cover 24 (for example, in FIG. 16, the position at a B-B cross section in FIG. 4). Note that the restrictor 273 of the present embodiment is merely an example of a restrictor, and the specific shape and the place of formation of the restrictor are not particularly limited. Also, the restrictor of the present embodiment may be provided in the document conveyance apparatus 20 of the first embodiment.

In the document conveyance apparatus 20 of the present embodiment, in a state in which the opening-and-closing cover 24 is opened, by virtue of the pressing force F2', it is possible to prevent the opening-and-closing cover 24 from being closed by its own weight, and the opening-and-closing cover 24 that is opened can also be held at a predetermined position by the restrictor 273. As described above, also in the configuration of the present embodiment, no complicated structure using another spring, an arm, or the like for holding the opening-and-closing cover that is opened is required. In other words, jam processing by opening the opening-and-closing cover 24 can be performed, and it becomes possible to hold the opening-and-closing cover 24 that is opened with a simple configuration.

The embodiments disclosed herein are merely exemplary in all respects, and do not constitute grounds for restrictive interpretation. Accordingly, the technical scope of the present disclosure should not be interpreted solely from the above-described embodiments, but is defined on the basis of the recitations of the claims.

What is claimed is:

1. A document conveyance apparatus including an opening-and-closing cover which is openable and closable with respect to an apparatus housing, the document conveyance apparatus comprising:

document conveyance rollers including a driving roller and a driven roller that is provided to be contactable with and separable from the driving roller;

a driven roller holding member that rotatably holds the driven roller, and that causes the driven roller to be in contact with or separated from the driving roller based on opening or closing of the opening-and-closing cover; and a biasing member which applies, to the driven roller holding member, a biasing force in a direction of bringing the driven roller into pressure contact with the driving roller, wherein:

the opening-and-closing cover is provided with a first contact protrusion and a second contact protrusion that contact the driven roller holding member, the driven roller holding member is provided with a first surface and a second surface, and in a state in which the opening-and-closing cover is opened, the first contact protrusion comes into contact with the first surface and the second contact protrusion comes into contact with the second surface, the first surface biases, by the biasing force of the biasing member, the first contact protrusion in a direction in which the opening-and-closing cover closes, and the second surface biases, by the biasing force of the biasing member, the second contact protrusion in a direction in which the opening-and-closing cover opens.

2. The document conveyance apparatus according to claim 1, wherein:

in a first state in which the opening-and-closing cover is in a process of being opened, the driven roller is separated from the driving roller as the second contact protrusion comes into contact with the second surface, and in the first state, the first contact protrusion is not in contact with the driven roller holding member.

3. The document conveyance apparatus according to claim 1, wherein when the opening-and-closing cover is opened after being in a first state in which the second contact protrusion that is in contact with the second surface is maintained, and further in a second state in which the opening-and-closing cover is opened, the first contact protrusion comes into contact with the first surface.

4. The document conveyance apparatus according to claim 1, wherein each of the first contact protrusion and the second contact protrusion comprises a rib that is provided on the opening-and-closing cover, respectively.

5. The document conveyance apparatus according to claim 4, wherein the rib of the first contact protrusion comprises a side wall of the opening-and-closing cover.

6. The document conveyance apparatus according to claim 4, wherein:

the document conveyance apparatus is provided with a connection rib which connects the ribs of the first contact protrusion to the second contact protrusion, and the connection rib has a shape that does not contact the driven roller holding member during a process of opening and closing the opening-and-closing cover.

7. An image forming apparatus comprising the document conveyance apparatus according to claim 1.

8. A document conveyance apparatus including an opening-and-closing cover which is openable and closable with respect to an apparatus housing, the document conveyance apparatus comprising:

document conveyance rollers including a driving roller and a driven roller that is provided to be contactable with and separable from the driving roller;

a driven roller holding member that rotatably holds the driven roller, and that causes the driven roller to be in contact with or separated from the driving roller based on opening or closing of the opening-and-closing cover; and a biasing member which applies, to the driven roller holding member, a biasing force in a direction of bringing the driven roller into pressure contact with the driving roller, wherein:

the opening-and-closing cover is provided with a cover side abutment protrusion which contacts the driven roller holding member when the opening-and-closing cover is opened, the driven roller holding member is provided with a driven-roller-holding-member-side abutment protrusion which contacts the cover side abutment protrusion when the opening-and-closing cover is opened, the apparatus housing is provided with a restricting protrusion which restricts the opening of the opening-and-closing cover beyond a predetermined position, and in a state in which the opening-and-closing cover is opened, the driven-roller-holding-member-side abutment protrusion biases, by the biasing force of the biasing member, the cover side abutment protrusion in a direction in which the opening-and-closing cover opens.

9. The document conveyance apparatus according to claim 8, wherein the restricting protrusion has a shape of a hook, and when the opening-and-closing cover is opened to the predetermined position, the hook engages with a side wall of the opening-and-closing cover.

* * * * *